US005624749A

United States Patent [19]

Kobayashi et al.

[11] Patent Number: 5,624,749

[45] Date of Patent: Apr. 29, 1997

[54] ELECTROMAGNETIC STEEL SHEET HAVING AN ELECTRICALLY INSULATING COATING WITH SUPERIOR WELDABILITY

[75] Inventors: Hideo Kobayashi, Okayama; Norio Kosuge, Chiba; Yasuo Yokoyama, Tokyo; Yuka Komori, Okayama; Taizo Mohri, Ohsaka, all of Japan

[73] Assignee: Kawasaki Steel Corporation, Japan

[21] Appl. No.: 285,028

[22] Filed: Aug. 2, 1994

[51] Int. Cl.$^{6}$ .......................... B32B 15/08; B32B 27/38; B32B 27/00

[52] U.S. Cl. .......................... 428/341; 428/403; 428/407; 428/418; 428/460; 428/461; 428/500

[58] Field of Search .................................... 428/457, 458, 428/460, 461, 500, 403, 407, 418, 341, 327

[56] References Cited

FOREIGN PATENT DOCUMENTS 60-36476 4/1985 Japan .

62-100561 5/1987 Japan .

*Primary Examiner*—Paul J. Thibodeau

*Assistant Examiner*—Stephen Sand

*Attorney, Agent, or Firm*—Austin R. Miller

[57] ABSTRACT

An electromagnetic steel sheet has an electrically insulating coating with superior weldability, formed by coating a treatment solution on the electromagnetic steel sheet and baking the same, the treatment solution containing a synthetic resin fine-particle emulsion having resistance against chromic and/or bichromic acid and exhibiting a peak temperature not lower than 400° C. at which a weight change rate is maximized when a sample is heated at a constant rate in differential thermal gravimetry, a chromate and/or bichromate base aqueous solution containing at least one kind of two-valence metal, and an organic reducer. The steel sheet is superior in electrical insulation, adhesion, punching ability, weldability and corrosion resistance.

11 Claims, No Drawings

ELECTROMAGNETIC STEEL SHEET HAVING AN ELECTRICALLY INSULATING COATING WITH SUPERIOR WELDABILITY

FIELD OF THE INVENTION

The present invention relates to an electromagnetic steel sheet having an electrically insulating coating primarily consisting of a chromate and/or bichromate and an organic resin, and method of manufacture. A core formed by laminating pieces punched out from the steel sheet exhibits superior weldability at its end faces.

DESCRIPTION OF THE RELATED ART

There are various characteristics required for insulating coatings of electromagnetic steel sheets, such as electrical insulation, adhesion, punching ability, weldability, and corrosion resistance. To meet those requirements, a variety of studies have been conducted and many techniques have been proposed in relation to methods of forming insulating coatings on surfaces of electromagnetic steel sheets and compositions of the insulating coatings.

In particular, a laminated or composite coating consisting of a chromate and/or bichromate and an organic resin is becoming more widely utilized because it can remarkably improve the punching ability of steel sheets as compared with the phosphate and chromate and/or bichromate base inorganic coatings conventionally employed.

For example, Japanese Patent Publication No. 60-36476 discloses a method of forming insulating coatings on electromagnetic steel sheets in which a treatment solution is prepared by mixing a bichromate and/or bichromate base aqueous solution containing at least one kind of two-valence metal with, with respect to 100 weight parts of $CrO_3$ in the aqueous solution, 5 to 120 weight parts of a resin emulsion in terms of resin solid, as an organic resin, the resin having a vinyl acetate / VEOVE (Vinyl Ester of Versatic Acid) ratio of 90/10 to 40/60, and 10 to 60 weight parts of an organic reducer, the prepared treatment solution is coated on surfaces of a base iron sheet, and the resultant coating is subject to baking in a normal manner.

Also, Japanese Patent Laid-Open No. 62-100561 discloses a method of forming an insulating coating on electromagnetic steel sheets in which a resin mixture solution is prepared by mixing an aqueous emulsion of pH 2 to 8 in which an organic substance base coating forming resin consisting of either one or both of acrylic resin and acrylic—styrene resin is emulsified and dispersed, with an aqueous dispersant of pH 6 to 8 in which acrylonitrile resin is dispersed, but an emulsifying dispersant is not substantially present, such that a nonvolatile component of the latter is present in an amount of 10 to 90 weight % with respect to the total amount of nonvolatile components of both the former and the latter, the prepared resin mixture solution is added and mixed with an aqueous solution of an inorganic substance base coating forming material containing a chromate and/or bichromate as a third ingredient such that a nonvolatile component of the resin mixture solution is present in an amount of 15 to 120 weight parts with respect to 100 weight parts of the chromate and/or bichromate in the aqueous solution in terms of $CRO_3$, and a resultant electromagnetic steel sheet insulating coating forming composition is coated on an electromagnetic steel sheet and then heated at temperatures of 300° C. to 500° C. to form an insulating coating at a density in the range of 0.4 to 2.0 $g/m^2$.

As the organic resin to be mixed with the chromate and/or bichromate chemical in the above methods, thermoplastic resins such as vinyl acetate resin, VEOVE (Vinyl Ester of Versatic Acid) resin, acrylic resin, polystyrene resin, acrylonitrile resin, polyester resin, and polyethylene resin have been used so far. These thermoplastic resins have the disadvantage of deteriorating corrosion resistance, because they start a pyrolysis reaction at relatively low temperatures in the baking step and decomposed gas produces a number of voids in the electrically insulating coating.

The above problem could be solved by utilizing organic thermosetting resins which have a cross-linked structure and start a pyrolysis reaction at high temperatures. However, since most thermosetting resins, not cross-linked, contain many reaction groups such as hydroxyl groups and epoxy groups, there would occur a reaction when mixed with the chromate and/or bichromate chemical, resulting in gelation. This would give rise to a serious problem from the viewpoint of industrial application since stability of the coating solution would deteriorate during storage prior to forming the electrically insulating coating. Furthermore, using a resin which has been subject to thermosetting beforehand has not been put into practice because of difficulty in dispersing such a resin as fine particles in an aqueous medium.

SUMMARY OF THE INVENTION

We have now found a thermosetting resin which does not gel when mixed with chromate and/or bichromate base chemical, and have accomplished the present invention which overcomes the foregoing problems.

More specifically, the present invention provides an electromagnetic steel sheet having an electrically insulating coating with superior weldability, wherein the electrically insulating coating is formed by coating a treatment solution on surfaces of the electromagnetic steel sheet and baking the same, the treatment solution containing a synthetic resin fine-particle emulsion having resistance against chromic and/or bichromic acid and exhibiting a peak temperature not lower than 400° C. at which a weight change rate is maximized when a sample is heated at a constant rising speed in differential thermal gravimetry, a chromate and/or bichromate base aqueous solution containing at least one kind of two-valence metal, and an organic reducer.

The synthetic resin fine-particle emulsion preferably contains at least a thermosetting synthetic resin capable of forming a cross-linked structure.

The synthetic resin fine-particle emulsion having resistance against chromic and/or bichromic acid preferably comprises thermosetting synthetic resin particles having outer layers formed by coating a synthetic resin having resistance against chromic and/or bichromic acid.

The thermosetting synthetic resin capable of forming a cross-linked structure is preferably an epoxy resin.

The synthetic resin having resistance against chromic and/or bichromic acid is preferably a polymer formed by emulsion-polymerizing ethylenically unsaturated carboxylic acid and an ethylenically unsaturated monomer which can copolymerize with the ethylenically unsaturated carboxylic acid.

The electrically insulating coating is preferably deposited in amount of 0.2 to 4.0 $g/m^2$ per unit area of the base iron sheet.

The treatment solution used in the present invention contains:

(a) aqueous emulsion of resin fine particles, (b) chromate and/or bichromate base aqueous solution containing at least one kind of two-valence metal, and (c) organic reducer.

Specific compositions of these three components are as follows. The component (a) is added to the component (b) such that, with respect to 100 weight parts of $CrO_3$ in the chromate and/or bichromate chemical, the former is preferably present in an amount of about 5 to 120 weight parts, more preferably about 20 to 80 weight parts in terms of resin solid in the emulsion. The amount of the component (c) added is preferably about 10 to 60 weight parts, more preferably about 20 to 50 weight parts, with respect to 100 weight parts of $CrO_3$ in the chromate and/or bichromate chemical.

The present invention is featured in a resin making up fine particles in the aqueous emulsion of the component (a). The resin used has resistance against chromic and/or bichromic acid and exhibits a maximum peak temperature not lower than about 400° C., preferably not lower than about 410° C., for a weight change rate when a sample is heated at a constant rate in differential thermal gravimetry.

Herein, the expression maximum peak temperature for a weight change rate in differential thermal gravimetry (DTG) means a temperature at which the weight change rate dG/dt (G is the sample weight and t is time) is maximized when a sample is heated in an inert atmosphere at a constant rate, e.g., 20° C. per minute. The amount by which the sample weight is reduced with respect to temperature is measured. Thermochemical behavior of materials is measured using thermal gravimetry (TG), differential thermal gravimetry (DTG), differential thermal analysis (DTA), etc. Thermochemical properties of the resin used in the present invention can be evaluated with the maximum peak temperature as a parameter. The maximum peak temperature can be determined by using a commercially available measuring apparatus for differential thermal analysis and thermal gravimetry, e.g., Model SSC/560GH manufactured by Daini Seiko-sha Co., Ltd., picking up a sample of about 10 mg, raising its temperature from 30° C. to 550° C. at a heat rate of 20° C./minute, and reading the resultant DTG graph.

While any kind of such resins can be used, the resin preferably contains a thermosetting synthetic resin capable of forming a cross-linked structure and has resistance against reaction with chromic and/or bichromic acid.

The resin used may comprise fine particles in one uniform layer or fine particles in a multi-layered structure.

In the case of a multi-layered structure, at least the resin making up one layer may exhibit a maximum peak temperature not lower than about 400° C. for a weight change rate when a sample is heated at a constant rising speed in differential thermal gravimetry, and at least the resin making up the other layer may have resistance against reaction with chromic and/or bichromic acid.

Pyrolysis of resins can be controlled by generating a cross-linked structure in fine particles. Accordingly, such control is achieved by employing a thermosetting resin. However, since most of the thermosetting resins which are able to form a cross-linked structure contain many functional groups such as hydroxyl groups and epoxy groups which are not cross-linked, those resins are inferior in resistance against chromic and/or bichromic acid and tend to easily gel with chromic and/or bichromic acid. This problem can be avoided by providing resin layers which have resistance against reaction with chromic and/or bichromic acid, on those surfaces of the fine particles which come into contact with chromic and/or bichromic acid.

Such a resin fine particle preferably comprises an inner layer (core) formed of a thermosetting resin capable of forming a cross-linked structure and an outer layer (shell) formed of a thermosetting resin having resistance against reaction with chromic and/or bichromic acid.

More specifically, examples of the thermosetting resin forming the inner layer (core) are phenol resin (such as phenol/formaldehyde resin, xylenol/formaldehyde resin, cresol/formaldehyde resin, and resorcinol/formaldehyde resin), epoxy resin (such as bisphenol type epoxy resin, alicyclic epoxy resin, Novolac type epoxy resin, aliphatic epoxy resin, and epoxidated urethane resin), furfural resin, urethane resin, unsaturated polyester resin, amino resin, polyimide resin, and polyamideimide resin. Other resins can also be employed so long as they can form a cross-linked structure.

It is essential that the core-coating resin having resistance against chromic and/or bichromic acid unifies with the thermosetting resin of the core to form an emulsion. This requirement is satisfied by a resin formed of ethylenically unsaturated carboxylic acid and a monomer which can copolymerize with the former.

Examples of the ethylenically unsaturated carboxylic acid employed herein are ethylenically unsaturated mono-basic carboxylic acids such as acrylic acid, methacrylic acid and crotonic acid, and ethylenically unsaturated dibasic carboxylic acids such as itaconic acid, maleic acid and fumaric acid. Further, examples of the ethylenically unsaturated monomer are alkyl esters of acrylic acid or methacrylic acid, such as (meth-)acrylic methyl, (meth-)acrylic ethyl, (meth-)acrylic n-butyl, (meth-)acrylic isobutyl, and (meth-)acrylic 2-ethylhexyl, and other monomers having ethylenically unsaturated bonds which can copolymerize with any of the above examples, such as styrene, a-methylstyrene, vinyl toluene, t-butylstyrene, ethylene, propylene, vinyl acetate, vinyl chloride, vinyl propionate, acrylonitrile, methacrylonitrile, (meth-)acrylic dimethylaminoethyl, vinyl pyridine, and acrylamide. Two or more kinds of those monomers may be used.

The resin fine particles described above have no limitations in diameter, but the mean particle diameter is preferably in the range of about 0.03 to 0.3 μm.

If the mean particle diameter is greater than 0.3 μm, three-dimensional roughness of the coating would be increased to further improve weldability, but the area occupation rate is reduced. Therefore, such a mean particle diameter is not preferable as an insulating coating for general purposes.

On the other hand, if the mean particle diameter is lower than about 0.03 μm, the resin surface area would be increased and a large amount of surfactant would have to be used to ensure stability in chromic and/or bichromic acid. This is unfavorable because of reducing weldability.

A preferable method of manufacturing the aqueous emulsion of core/shell type resin fine particles used in the present invention will be described below in detail.

Emulsion polymerization is a multi-stage process comprising at least two stages; i.e., first-stage emulsion polymerization for forming core resin particles, and second-stage emulsion polymerization for forming a coating of a shell copolymer on surfaces of the core resin particles. In the first-stage emulsion polymerization, cores are first formed. More specifically, a thermosetting resin used as fine particles making up the cores can easily be prepared by dissolving a water-insoluble thermosetting resin in an ethylenically unsaturated monomer used for emulsion polymerization, and subjecting them to emulsion polymerization in a known manner. Alternatively, such a thermosetting resin can be prepared by adding and dispersing a water-insoluble thermosetting resin in the water phase which contains an emulsifier, and subjecting it to emulsion polymerization while adding an ethylenically unsaturated monomer. The water-insoluble thermosetting resin may be any selected from among commercially available resins such as phenol resin, epoxy resin, furfural resin, urethane resin, unsaturated polyester resin, amino resin, polyimide resin, and polyimideamide resin, which is insoluble or nearly insoluble in water.

In the second-stage emulsion polymerization, shells coating the cores are formed. To provide the resin particles with a two-layered structure, in the second-stage emulsion polymerization, no emulsifier is newly added, or an emulsifier is added, if so, in such a small amount as not to form new resin particles, so that the polymerization substantially progresses on the surfaces of the resin particles formed in the first-stage emulsion polymerization. It is essential that the shells formed in the second-stage emulsion polymerization are hydrophilic. Therefore, the ethylenically unsaturated monomer containing an amino group is suitably used as the ethylenically unsaturated monomer, and preferable examples are N-methylaminoethyl acrylate or methacrylate, monopyridines such as vinyl pyridine, vinyl ethers having alkyl amino groups, such as dimethylaminoethyl vinyl ether, and unsaturated amides having alkyl amino groups, such as N-(2-dimethylaminoethyl) acrylic amide or methacrylic amide. The ethylenically unsaturated monomer containing an amino group may be employed as a single polymer, but it is most advantageous to use the monomer as a copolymer with another ethylenically unsaturated monomer.

In the second-stage emulsion polymerization, ethylenically unsaturated carboxylic acid may be used as part of the ethylenically unsaturated monomer.

Specifically, examples of the ethylenically unsaturated carboxylic acid are ethylenically unsaturated mono-basic carboxylic acids such as acrylic acid, methacrylic acid and crotonic acid, and ethylenically unsaturated bi-basic carboxylic acids such as itaconic acid, maleic acid or fumaric acid. One or two or more of these examples may be employed.

The emulsion polymer prepared in the first stage is added to a water phase and is subjected to emulsion polymerization in a known manner while similarly adding a mixture of ethylenically unsaturated monomers and a radical generation initiator, whereby the aqueous emulsion of resin fine particles according to the present invention is formed. An emulsifier may be added to prevent generation of agglomerates and to ensure stability of the polymerization reaction. The emulsifier used in the present invention may be of the type typically used in normal emulsion polymerization, for example, an anionic emulsifier such as sodium alkylbenzene sulfonate or a non-ionic emulsifier such as polyoxyethylene alkyl ether.

The radical generation initiator used in the emulsion polymerization reaction may be selected from potassium persulfate, ammonium persulfate, azobisisobutyronitrile, etc. The concentration during the emulsion polymerization is generally preferably selected so that the resin in the final aqueous emulsion has a solids content of about 25 to 65 weight %. Further, the temperature during the emulsion polymerization reaction may be in the normal range where well-known processes are practiced, and emulsion polymerization is usually carried out under normal pressure.

The mixing rate of the core thermosetting resin to the shell resin having resistance against chromic and/or bichromic acid, both the resins making up the aqueous emulsion of resin fine particles, is preferably selected such that the resin having resistance against chromic and/or bichromic acid is present in an amount of about 2 to 100 weight parts with respect to 100 weight parts of the thermosetting resin. Specifically, if the mixing percentage of the resin having resistance against chromic and/or bichromic acid is not greater than about 2 weight parts, the core thermosetting resin could not be completely coated and hence would be subjected to gelling when mixed with the chromate and/or bichromate base chemical. On the other hand, if the mixing percentage of the resin having resistance against chromic and/or bichromic acid is not less than about 100 weight parts, resistance against pyrolysis may not be improved.

The component (b) of the treatment solution used in the present invention is preferably a chromate and/or bichromate base aqueous solution containing at least one kind of two-valence metal. Thus, it is an aqueous solution using at least one of chromic and/or bichromic anhydride, chromate and/or bichromate, and bichromate and/or bichromate as a main ingredient.

Examples of the chromates and/or bichromates which can be used are salts of sodium, potassium, magnesium, calcium, manganese, molybdenum, zinc, aluminum, etc.

As the two-valence metal to be dissolved, oxides such as MgO, CaO and ZnO, hydroxides such as $Mg(OH)_2$, $Ca(OH)_2$ and $Zn(OH)_2$, as well as carbonates such as $MgCO_3$, $CaCO_3$ and $ZnCO_3$ can be used.

The desired chromate and/or bichromate base aqueous solution is prepared by dissolving at least one of chromic and/or bichromic anhydride, chromate and/or bichromate, and bichromate and/or bichromate, as a main ingredient, in an aqueous solution.

The treatment solution further contains, as the component (c), an organic reducer for making the coating insoluble. The organic reducer is preferably any of polyhydric alcohols such as glycerin, ethyl glycol, and cane sugar (sucrose), i.e., a reducer suitable for 6-valent chromium. The amount of organic reducer added is preferably about 10 to 60 weight parts with respect to 100 weight parts of $CrO_3$, but is not particularly limited.

If the mixing percentage of the organic reducer is less than about 10 weight parts, water resistance of the coating would tend to be deteriorated. On the other hand, if it is greater than about 60 weight parts, a reducing reaction would tend to take place in the treatment solution, resulting in gelation of the treatment solution.

In addition a borate, a phosphate or the like may be added to further increase the heat resistance of the coating. Further, colloidal materials such as colloidal silica or inorganic fine particles such as silica powder may be added to improve interlayer resistance after annealing for removal of distortions.

The electromagnetic steel sheet of the present invention is manufactured as follows.

The treatment solution having the above-described compositions is continuously coated over surfaces of the electromagnetic steel sheet by using a roll coater or the like, and is then baked to solidify in a short period of time at temperatures of a drying furnace atmosphere ranging from 300° to 700° C. As a result, an objectively satisfactory electrically insulating coating is formed. The amount of coating deposited after baking is about 0.2 to 4 $g/m^2$, preferably about 0.3 to 3 $g/m^2$. If the amount is less than about 0.2 $g/m^2$, a coverage rate of the insulating coating would be reduced, and if it exceeds about 4 $g/m^2$, adhesion of the insulating coating would tend to deteriorate.

It has been confirmed that the insulating coating thus obtained is not only superior in weldability, but also quite satisfactory in other various characteristics required for insulating coating, such as adhesion, electrical insulation, corrosion resistance, heat resistance, and resistance against pharmaceuticals.

DETAILED DESCRIPTION OF THE PREFERRED EMBODIMENTS

The present invention will hereinafter be described in more detail in conjunction with embodiments or examples. But it is to be noted that the present invention is not limited to the examples below.

The resin emulsion (El) for use in the present invention was manufactured by using the following materials and method. The following materials were put into and dissolved in a reaction container having a volume of 1.5 L and equipped with an agitator, a circulating condenser, and a dipping funnel:

| | |
|---|---|
| deionized water | 3240 parts |
| Emulgen 931 (nonioic emulsifier by Kao Co., Ltd.) | 10.0 parts |
| Neogen R (anioic emulsifier by Dai-ichi Kogyo Seiyaku Co., Ltd.) | 4.0 parts |

Then, the following mixture was put into the dipping funnel for the first-stage emulsion polymerization:

| | |
|---|---|
| bisphenol type epoxy resin | 100 parts |
| butyl acrylate | 200 parts |
| methyl methacrylate | 100 parts |
| acrylic acid | 8.0 parts |

The temperature in the reaction container was raised to 60° C. under agitation while introducing nitrogen gas, and 40 parts of a 2% aqueous solution of potassium persulfate dissolved in deionized water was added thereto. After that, 20% of the epoxy resin and the monomer mixture of butyl acrylate, methyl methacrylate and acrylic acid, all put in the dipping funnel, was added thereto. A temperature rise due to the polymerization heat was controlled by a water bath to keep the temperature in the reaction container at 80° C. Then, the remainder of the epoxy resin and the monomer mixture and 80 parts of a 2% aqueous solution of potassium persulfate were dipped over 2 hours for progress of the polymerization. After holding the reaction container at 80° C. for another 2 hours, the content was cooled down to room temperature and then filtered with a 200-mesh filtering cloth to obtain an emulsified polymer as seed or core particles. The nonvolatile component of this polymer had a content of 50.3 wt % and a pH of 2.8.

452 parts of the emulsified polymer obtained above and 125 parts of water were put in a similar reaction container having a volume of 1.5 L. Then, the following mixture of ethylenically unsaturated monomers was prepared and put into a dipping funnel for the second-stage emulsion polymerization:

| | |
|---|---|
| ethyl acrylate | 60 parts |
| methyl methacrylate | 30 parts |
| dimethylaminoethyl methacrylate | 2.0 parts |
| acrylic acid | 1.0 part |

The temperature in the reaction container was raised to 70° C. under agitation while introducing nitrogen gas, and 60 parts of a 2% aqueous solution of potassium persulfate put into another dipping funnel, and the above monomer mixture was dipped for polymerization. This dipping was conducted over 2 hours while keeping the temperature in the reaction container at 70° C. After holding the reaction container at 70° C. for another 2 hours, the content was cooled down to room temperature and then filtered with a 200-mesh filtering cloth to obtain a polymer emulsion for use in the present invention. The resin solid in the resultant polymer emulsion had a content of 48 wt %.

The resin emulsion (E2) for use in the present invention was manufactured by using the following materials and method.

The following mixture was employed for the first-stage emulsion polymerization:

| | |
|---|---|
| bisphenol type epoxy resin | 100 parts |
| ethyl acrylate | 300 parts |
| methyl methacrylate | 100 parts |
| methacrylic acid | 8.0 parts |

The following mixture was employed for the second-stage emulsion polymerization:

| | |
|---|---|
| ethyl acrylate | 50 parts |
| methyl methacrylate | 30 parts |
| acrylic acid | 2.0 parts |
| buthyl acrylate | 2.0 parts |

The other part of the method was the same as in the above example. The resin solid in the resultant polymer emulsion had a content of 52 wt %.

The resin emulsion (E3) for use in the present invention was manufactured by using the following materials and method.

The method was the same as in the above first example except for using the following mixture for the first-stage emulsion polymerization:

| | |
|---|---|
| resol type phenol formaldehyde resin | 100 parts |
| ethyl acrylate | 200 parts |
| methyl methacrylate | 100 parts |
| methacrylic acid | 8.0 parts |

The resin emulsion (E4) for use in the present invention was manufactured by using the following materials and method.

The following mixture was employed for the second-stage emulsion polymerization. The resin solid in the resultant polymer emulsion had a content of 46 wt %.

| | |
|---|---|
| ethyl acrylate | 50 parts |
| methyl methacrylate | 30 parts |
| vinyl pyridine | 1.0 part |
| acrylic acid | 1.0 part |

The other part of the method was the same as in the above first example.

The resin emulsion (E5) for use in the present invention was manufactured by using the following materials and method.

The following mixture was employed for the second-stage emulsion polymerization. The resin solid in the resultant polymer emulsion had a content of 46 wt %.

| | |
|---|---|
| ethyl acrylate | 50 parts |
| methyl methacrylate | 30 parts |
| acrylic amide | 1.0 part |
| acrylic acid | 1.0 part |

The other part of the method was the same as in the above first example.

The treatment solutions consisted of various components shown in Table 1. They were each coated over surfaces of an electromagnetic steel sheet 0.5 mm thick, and then baked for 80 seconds at 450° C. in a hot air furnace to form an insulating coating on the steel sheet surfaces.

In the examples, the coating operation and stability of the treatment solutions over time were very satisfactory, and uniform coatings were obtained in amounts deposited, as shown in Table 2. In some of the comparative examples, however, the resin emulsions in the coating solutions gelled so as to prevent painting on the coatings.

Subsequently, sheet pieces each being 30 mm wide, 130 long and 0.5 mm thick were blanked out by a shearing machine from the resultant electromagnetic steel sheet having the insulating coating with the rolling direction facing transversely. The sheet pieces were laminated and clamped under a clamping pressure of 100 kg/cm. The resultant laminate was subject as its laminated section to TIG welding under conditions of 120 A current and Ar shield gas (flow rate of 6 l/min). During the welding, generation of blow holes was checked and the maximum welding speed free from blow holes was measured in unit of cm/min. The measured result was shown in Table 2 along with other characteristics of the coating. Measuring methods and determination criteria for those characteristics are as follows.

(1) Interlayer resistance

Interlayer resistance was measured in accordance with JIS, second method. The greater the interlayer resistance value, the better the electrical insulation.

(2) Adhesion before annealing: the sheet was bent to measure the diameter (cm) at which the coating does not peel off.

after annealing: tape peeling of the coating was observed for the flat sheet.

The less peeling, the better the adhesion.

(3) Corrosion resistance

A salt water spray test was conducted and the rusting rate on the surface after 7 hours was measured in units of %. The smaller the rusting rate, the better the corrosion resistance.

(4) Coolant resistance

The sheet was left in a mixture of Freon 22: refrigerator oil=9:1 for 10 days at 80° C., and the amount of weight reduced was measured.

The smaller the weight reduction, the better the coolant resistance.

(5) Oil resistance

The sheet was immersed in No. 1 insulating oil for 72 hours at 120° C., and the amount of weight reduced was measured.

The smaller the weight reduction, the better the oil resistance.

(6) Punching ability

The number of repeated punching steps until the burr height reached 50 μm was measured by using a steel die of 15 mmu.

The larger the number of punching times until the burr height reached 50 μm, the better the punching ability.

(7) Heat resistance

A sample was heated in an inert atmosphere at a rate of 20° C. per minute in differential thermal gravimetry, and the amount of sample weight reduced was measured with respect to temperature to determine the peak temperature at which a weight change rate dG/dt was maximized. The higher the maximum peak temperature, the better the heat resistance.

Resins used in the comparative examples were as follows.

R1: bisphenol type epoxy resin aqueous emulsion (content of solid resin; 40 wt %)

R2: vinyl acetate resin aqueous emulsion (content of solid resin; 45 wt %)

R3: resol type phenol resin aqueous emulsion (content of solid resin; 53 wt %)

R4: polyester resin aqueous emulsion (content of solid resin; 55 wt %)

R5: acrylic resin aqueous emulsion (content of solid resin; 47 wt %)

copolymer of 50 weight parts of methyl acrylate and 30 weight parts of butyl acrylate R6: styrene resin aqueous emulsion (content of solid resin; 46 wt %)

As described above, the present invention provides an electromagnetic steel sheet having an electrically insulating coating which is formed by coating a treatment solution on surfaces of the steel sheet and baking, the treatment solution being composed of a particular resin fine-particle emulsion, a chromate and/or bichromate base aqueous solution, and an organic reducer. The steel sheet is superior in electrical insulation, adhesion, punching ability and corrosion resistance, and a core formed by laminating pieces punched out from the steel sheet exhibits superior weldability at its end faces.

TABLE 1

(weight parts)

| | EXAMPLE 1 | EXAMPLE 2 | EXAMPLE 3 | EXAMPLE 4 |
|---|---|---|---|---|
| TYPE OF EMULSION | E 1 | E 1 | E 1 | E 2 |
| AMOUNT OF EMULSION ADDED* | 25 | 10 | 80 | 40 |
| TYPE AND AMOUNT OF CHROMATE ADDED | CHROMIC ANHYDRIDE: 30 MAGNESIA: 7 WATER: 100 | CALCIUM BICHROMATE: 30 WATER: 100 | CHROMIC ANHYDRIDE: 30 ZINC HYDROXIDE: 7 WATER: 100 | CHROMIC ANHYDRIDE: 30 MAGNESIUM CARBONATE: 16 WATER: 100 |

TABLE 1-continued

| | | | | |
|---|---|---|---|---|
| TYPE AND AMOUNT OF REDUCER ADDED** | ETHYLENE GLYCOL: 10 | GLYCERIN: 20 | SUCROSE: 60 | ETHYLENE GLYCOL: 30 |
| TYPE AND AMOUNT OF ASSISTANT*** | COLLOIDAL SILICA: 15 | BORIC ACID: 10 | CALCIUM PHOSPHATE: 20 | COLLOIDAL SILICA: 15 |

(weight parts)

| | EXAMPLE 5 | EXAMPLE 6 | EXAMPLE 7 |
|---|---|---|---|
| TYPE OF EMULSION | E 3 | E 4 | E 5 |
| AMOUNT OF EMULSION ADDED* | 25 | 30 | 25 |
| TYPE AND AMOUNT OF CHROMATE ADDED | CHROMIC ANHYDRIDE: 30<br>CALCIUM OXIDE: 12<br>WATER: 100 | CHROMATE ANHYDRIDE: 30<br>ZINC OXIDE: 7<br>MAGNESIA: 10<br>WATER: 100 | CHROMATE ANHYDRIDE: 30<br>MAGNESIA: 7<br>WATER: 100 |
| TYPE AND AMOUNT OF REDUCER ADDED** | ETHYLENE GLYCOL: 50 | ETHYLENE GLYCOL: 10 | ETHYLENE GLYCOL: 10 |
| TYPE AND AMOUNT OF ASSISTANT*** | COLLOIDAL ALUMINUM: 15 | ZIRCONIA SOL: 15 | COLLOIDAL SILICA: 15 |

*AMOUNT IN TERMS OF RESIN SOLID WEIGHT PARTS OF CHROMIC ANHYDRIDE
**AMOUNT WITH RESPECT TO 100 WEIGHT PARTS OF CHROMIC ANHYRIDE
***AMOUNT IN TERMS OF SOLID WITH RESPECT TO 100 WEIGHT PARTS OF CHROMIC ANHYRIDE

TABLE 2

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| STABILITY OF COATING SOLUTION | GOOD | GOOD | GOOD | GOOD | GOOD | GOOD | GOOD |
| AMOUNT OF COATING DEPOSITED (g/m$^2$) | 0.9 | 1.0 | 0.6 | 0.8 | 1.2 | 3.0 | 0.3 |
| INTERLAYER RESISTANCE (Ω-cm$^2$/sec) | | | | | | | |
| BEFORE ANNEALING | 36 | 42 | 23 | 27 | 21 | OVER 200 | 16 |
| AFTER ANNEALING | 5.9 | 6.4 | 3.8 | 5.1 | 6.2 | 8.7 | 2.8 |
| ADHESION (cm) | | | | | | | |
| BEFORE ANNEALING BENT | 10 | 10 | 10 | 15 | 10 | 20 | 10 |
| AFTER ANNEALING FLAT | NO PEELING | NO PEELING | NO PEELING | NO PEELING | NO PEELING | NO PEELING | NO PEELING |
| CORROSION RESISTANCE RUSTING RATE (%) | LESS THAN 20 | LESS THAN 20 | LESS THAN 15 | LESS THAN 20 | LESS THAN 20 | LESS THAN 5 | LESS THAN 20 |
| WELDABILITY (cm/min) MAX-SPEED FREE FROM BLOW HOLES | 60 | 60 | 50 | 60 | 60 | 40 | 120 |
| PUNCHING ABILITY (MILLION TIMES) | OVER 150 | OVER 150 | 100 | OVER 150 | OVER 150 | OVER 150 | 80 |
| COOLANT RESISTANCE WEIGHT CHANGE | ALMOST NONE | ALMOST NONE | ALMOST NONE | ALMOST NONE | ALMOST NONE | ALMOST NONE | ALMOST NONE |
| OIL RESISTANCE WEIGHT CHANGE | ALMOST NONE | ALMOST NONE | ALMOST NONE | ALMOST NONE | ALMOST NONE | ALMOST NONE | ALMOST NONE |
| PYROLYSIS TEMPERA-TURE PEAK TEMPERATURE (°C.) | 423 | 423 | 423 | 438 | 416 | 412 | 420 |

TABLE 3

(weight parts)

| | COMPARATIVE EXAMPLE 1 | COMPARATIVE EXAMPLE 2 | COMPARATIVE EXAMPLE 3 |
|---|---|---|---|
| TYPE OF EMULSION | R 1 | R 2 | R 3 |
| AMOUNT OF EMULSION ADDED* | 20 | 25 | 20 |
| TYPE AND AMOUNT OF CHROMATE ADDED | MAGNESIUM BICHROMATE: 30<br>WATER: 100 | CALCIUM BICHROMATE: 30<br>WATER: 100 | MAGNESIUM BICHROMATE: 30<br>WATER: 100 |
| TYPE AND AMOUNT OF REDUCER ADDED** | SUCROSE: 15 | GLYCERIN: 10 | GLYCERIN: 8 |
| TYPE AND AMOUNT OF ASSISTANT*** | COLLOIDAL SILICA: 20 | BORIC ACID: 15 | COLLOIDAL ALUMINUM: 25 |

(weight parts)

| | COMPARATIVE EXAMPLE 4 | COMPARATIVE EXAMPLE 5 | COMPARATIVE EXAMPLE 6 |
|---|---|---|---|
| TYPE OF EMULSION | R 4 | R 5 | R 6 |
| AMOUNT OF EMULSION ADDED* | 30 | 15 | 27 |
| TYPE AND AMOUNT OF CHROMATE ADDED | CHROMIC ANHYDRIDE: 30<br>MAGNESIA: 7<br>WATER: 100 | CALCIUM BICHROMATE: 30<br>WATER: 100 | CHROMIC ANHYDRIDE: 30<br>ZINC OXIDE: 15<br>WATER: 100 |
| TYPE AND AMOUNT OF REDUCER ADDED** | SUCROSE: 10 | ETHYLENE GLYCOL: 55 | GLYCERIN: 20 |
| TYPE AND AMOUNT OF ASSISTANT*** | ZIRCONIA SOL: 18 | BORIC ACID: 12 | CALCIUM PHOSPHATE: 20 |

*AMOUNT IN TERMS OF RESIN SOLID WEIGHT PARTS OF CHROMIC ANHYDRIDE
**AMOUNT WITH RESPECT TO 100 WEIGHT PARTS OF CHROMIC ANHYRIDE
***AMOUNT IN TERMS OF SOLID WITH RESPECT TO 100 WEIGHT PARTS OF CHROMIC ANHYRIDE

TABLE 4

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|
| STABILITY OF COATING SOLUTION | X (GELATION) | ○ | X (GELATION) | ○ | ○ | ○ |
| AMOUNT OF COATING DEPOSITED (g/m²) | SOUND COATING NOT PRODUCED | 1.1 | SOUND COATING NOT PRODUCED | 0.9 | 2.2 | 0.6 |
| INTERLAYER RESISTANCE (Ω-cm²/sec) | | | | | | |
| BEFORE ANNEALING | | 21 | | 16 | 27 | 8 |
| AFTER ANNEALING | | 1.8 | | 1.6 | 2.9 | 5.7 |
| ADHESION (cm) | | | | | | |
| BEFORE ANNEALING BENT | | 10 | | 10 | 20 | 10 |
| AFTER ANNEALING FLAT | | NO PEELING | | NO PEELING | NO PEELING | NO PEELING |
| CORROSION RESISTANCE RUSTING RATE (%) | | 40 | | 30 | 10 | 20 |
| WELDABILITY (cm/min) MAX-SPEED FREE FROM BLOW HOLES | | 40 | | 30 | 10 | 40 |
| PUNCHING ABILITY (MILLION TIMES) | | >150 | | >150 | >150 | 100 |
| COOLANT RESISTANCE WEIGHT CHANGE | | ALMOST NONE | | A LITTLE | ALMOST NONE | ALMOST NONE |
| OIL RESISTANCE WEIGHT CHANGE | | ALMOST NONE | | A LITTLE | ALMOST NONE | ALMOST NONE |
| PYROLYSIS TEMPERATURE PEAK TEMPERATURE (°C.) | | 360 | | 345 | 390 | 395 |

What is claimed is:

1. An electromagnetic steel sheet having an electrically insulating coating, wherein said electrically insulating coating comprises a treatment solution coated on an electromagnetic steel sheet; said sheet treatment solution comprising:

(a) a synthetic resin particle emulsion having resistance to reaction with chromic acid and/or bichromic acid and exhibiting a peak temperature not lower than about 400° C., said peak temperature being the temperature at which the weight change of a sample of said resin particle emulsion is maximized when said sample is being heated at a constant rate in differential thermal gravimetry, (b) a chromate and/or bichromate aqueous solution containing at least one divalent metal, $CrO_3$ and at least one ion selected from the group consisting of $CrO_4^-$ and $Cr_2O_7^{2-}$[$Cr_2O_72^-$], and (c) an organic reducer in an amount of about 10 to 60 weight parts per 100 weight parts of $CrO_3$ in said chromate and/or bichromate base aqueous solution, said electrically insulating coating being deposited on said electromagnetic steel sheet in an amount of about 0.2 $g/m^2$ to 4 $g/m^2$ on a dry weight basis.

2. An electromagnetic steel sheet according to claim 1, wherein said synthetic resin particle emulsion contains at least a thermosetting synthetic resin capable of forming a cross-linked structure.

3. An electromagnetic steel sheet according to claim 1 or 2, wherein said synthetic resin particle emulsion having resistance to reaction with chromic and/or bichromic acid is an emulsion comprising thermosetting synthetic resin particles having an inner core of thermosetting synthetic resin and an outer shell of synthetic resin having resistance against reaction with chromic and/or bichromic acid, wherein said outer shell comprises about 2 to 100 weight parts per to 100 weight parts of said inner core.

4. An electromagnetic steel sheet according to claim 1, wherein said thermosetting synthetic resin capable of forming a cross-linked structure is epoxy resin.

5. An electromagnetic steel sheet according to claim 1 or 2, wherein said synthetic resin having resistance against chromic and/or bichromic acid is a polymer formed by emulsion-polymerizing ethylenically unsaturated carboxylic acid and an ethylenically unsaturated monomer which can copolymerize with said ethylenically unsaturated carboxylic acid.

6. An electromagnetic steel sheet according to claim 3, wherein said thermosetting synthetic resin capable of forming a cross-linked structure is epoxy resin.

7. An electromagnetic steel sheet according to claim 3, wherein said synthetic resin having resistance to reaction with chromic and/or bichromic acid is a polymer formed by emulsion-polymerizing ethylenically unsaturated carboxylic acid and an ethylenically unsaturated monomer which can copolymerize with said ethylenically unsaturated carboxylic acid.

8. An electromagnetic steel sheet according to claim 4, wherein said synthetic resin having resistance to reaction with chromic and/or bichromic acid is a polymer formed by emulsion-polymerizing ethylenically unsaturated carboxylic acid and an ethylenically unsaturated monomer which can copolymerize with said ethylenically unsaturated carboxylic acid.

9. An electromagnetic sheet according to claim 1, wherein said synthetic resin particle emulsion comprises particles having a mean particle diameter within the range of about 0.03 to 0.3 μm.

10. An electromagnetic sheet according to claim 1, wherein said synthetic resin particle emulsion content in said sheet treatment solution is, in terms of synthetic resin particles, about 5 to 120 weight parts per 100 weight parts of $CrO_3$.

11. A coated electromagnetic steel sheet, comprising:

(a) an electromagnetic steel sheet, and (b) an electrically insulating coating on said steel sheet in an amount of about 0.2 $g/m^2$ to 4 $g/m^2$ on a dry weight basis; said coating including a synthetic resin particle emulsion possessing resistance to reaction with chromic acid and/or bichromic acid and exhibiting a peak temperature not lower than about 400° C., said peak temperature being the temperature at which a weight change rate is maximized when a dried sample of said resin particle emulsion is heated at a constant rate in differential thermal gravimetry, a chromate and/or bichromate aqueous solution containing at least one divalent metal, at least one ion selected from the group consisting of $CRO_4^-$ and $CrO_7^{2-}$, and an organic reducer in an amount of about 10 to 60 weight parts per 100 weight parts of $CrO_3$.

* * * * *